(12) United States Patent
Crain et al.

(10) Patent No.: US 7,735,365 B2
(45) Date of Patent: Jun. 15, 2010

(54) SAFE AND ACCURATE METHOD OF CHEMICAL INVENTORY MANAGEMENT ON LOCATION

(75) Inventors: Stephen Crain, Duncan, OK (US); Michael Segura, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 467 days.

(21) Appl. No.: 11/741,509

(22) Filed: Apr. 27, 2007

(65) Prior Publication Data

US 2008/0271927 A1 Nov. 6, 2008

(51) Int. Cl.
*G01F 22/00* (2006.01)
*G01F 23/20* (2006.01)
*G01G 13/00* (2006.01)

(52) U.S. Cl. .............................. 73/296; 222/58; 141/83; 177/59; 177/116; 177/200

(58) Field of Classification Search .................. 73/296; 222/58; 141/83; 177/59, 116, 199, 200
See application file for complete search history.

(56) References Cited

U.S. PATENT DOCUMENTS

| | | | | |
|---|---|---|---|---|
| 1,730,173 A | * | 10/1929 | Stearns | 73/296 |
| 2,795,403 A | | 6/1957 | Mead | 259/4 |
| 2,821,854 A | * | 2/1958 | Franke | 73/296 |
| 3,155,248 A | | 11/1964 | Haller | 214/38 |
| 3,291,234 A | | 12/1966 | Woodburn | |
| 3,381,943 A | | 5/1968 | Miller | 259/148 |
| 3,547,291 A | | 12/1970 | Batterton et al. | 214/515 |
| 3,687,319 A | | 8/1972 | Adam et al. | 214/501 |
| 3,792,790 A | | 2/1974 | Brubaker | 214/501 |
| 3,854,540 A | | 12/1974 | Holmstrom, Jr. | |
| 3,857,452 A | | 12/1974 | Hartman | |
| 3,893,655 A | | 7/1975 | Sandiford | 259/4 |
| 3,931,999 A | | 1/1976 | McCain | 302/14 |
| 3,934,739 A | | 1/1976 | Zumsteg et al. | 214/501 |
| 4,063,605 A | * | 12/1977 | Graham | 177/225 |
| 4,103,752 A | | 8/1978 | Schmidt | |

(Continued)

FOREIGN PATENT DOCUMENTS

DE    37 17 417 A1    12/1988

(Continued)

OTHER PUBLICATIONS

Foreign communciation related to a counterpart application dated Jul. 28, 2008.

(Continued)

*Primary Examiner*—Randy W Gibson
(74) *Attorney, Agent, or Firm*—John W. Wustenberg; Baker Botts, LLP

(57) ABSTRACT

The present invention provides a method of measuring an amount of a substance depleted from a storage unit, including the steps of: supporting the storage unit on a vehicle, measuring a first weight of the storage unit and any liquid substance contained in the storage unit, allowing a quantity of the liquid substance to be discharged from the storage unit, measuring a second weight of the storage unit and any liquid substance contained in the storage unit, and determining the amount of liquid substance discharged or allowed to be discharged from the storage unit based on the first weight measurement and the second weight measurement.

18 Claims, 2 Drawing Sheets

U.S. PATENT DOCUMENTS

| | | | | |
|---|---|---|---|---|
| 4,163,626 | A | 8/1979 | Batterton et al. | 414/469 |
| 4,187,047 | A | 2/1980 | Squifflet | 414/332 |
| 4,249,838 | A | 2/1981 | Harvey et al. | 406/51 |
| 4,345,628 | A * | 8/1982 | Campbell et al. | 141/83 |
| 4,411,327 | A | 10/1983 | Lockery et al. | 177/211 |
| 4,465,420 | A | 8/1984 | Dillman | 414/332 |
| 4,621,972 | A | 11/1986 | Grotte | 414/477 |
| 4,634,335 | A | 1/1987 | Van Den Pol | 414/494 |
| 4,726,435 | A | 2/1988 | Kitagawa et al. | 177/187 |
| 4,775,275 | A | 10/1988 | Perry | 414/21 |
| 4,819,750 | A | 4/1989 | Carnevale | 177/256 |
| 4,844,189 | A | 7/1989 | Shisgal et al. | 177/211 |
| 5,127,450 | A * | 7/1992 | Saatkamp | 141/9 |
| 5,133,212 | A * | 7/1992 | Grills et al. | 73/296 |
| 5,161,628 | A * | 11/1992 | Wirth | 177/137 |
| 5,205,370 | A | 4/1993 | Paul et al. | |
| 5,343,000 | A | 8/1994 | Griffen et al. | 177/145 |
| 5,578,798 | A | 11/1996 | Nuyts | |
| 5,635,680 | A | 6/1997 | Dojan | |
| 5,637,837 | A | 6/1997 | Merz et al. | |
| 5,665,910 | A * | 9/1997 | Knutson et al. | 73/200 |
| 5,717,167 | A * | 2/1998 | Filing et al. | 177/136 |
| 5,764,522 | A * | 6/1998 | Shalev | 700/240 |
| 5,811,737 | A * | 9/1998 | Gaiski | 177/1 |
| 5,811,738 | A | 9/1998 | Boyovich et al. | |
| 5,850,757 | A * | 12/1998 | Wierenga | 73/296 |
| 5,880,410 | A | 3/1999 | Neuman | 177/187 |
| 6,118,083 | A | 9/2000 | Boyovich et al. | |
| 6,148,667 | A * | 11/2000 | Johnson | 73/296 |
| 6,186,657 | B1 | 2/2001 | Fuchsbichler | 366/165.4 |
| 6,242,701 | B1 | 6/2001 | Breed et al. | |
| 6,284,987 | B1 * | 9/2001 | Al-Modiny | 177/170 |
| 6,313,414 | B1 * | 11/2001 | Campbell | 177/16 |
| 6,384,349 | B1 * | 5/2002 | Voll | 177/25.19 |
| 6,474,926 | B2 | 11/2002 | Weiss | 414/332 |
| 6,495,774 | B1 | 12/2002 | Pederson | |
| 6,769,315 | B2 | 8/2004 | Stevenson et al. | |
| 6,948,535 | B2 | 9/2005 | Stegemoeller | 141/67 |
| 7,048,432 | B2 | 5/2006 | Phillippi et al. | 366/164.1 |
| 7,202,425 | B2 | 4/2007 | Knudsen et al. | |
| 7,214,028 | B2 | 5/2007 | Boasso | 414/812 |
| 7,214,892 | B2 | 5/2007 | Williamson | 177/170 |
| 7,240,549 | B2 * | 7/2007 | Kimbara et al. | 73/296 |
| 7,267,001 | B1 * | 9/2007 | Stein | 73/296 |
| 7,353,875 | B2 | 4/2008 | Stephenson et al. | 166/305.1 |
| 7,528,329 | B2 | 5/2009 | Nuyts | |
| 2001/0038018 | A1 | 11/2001 | Bell et al. | |
| 2003/0202869 | A1 | 10/2003 | Posch | 414/498 |
| 2007/0125543 | A1 | 6/2007 | McNeel et al. | 166/308.3 |
| 2007/0201305 | A1 | 8/2007 | Heilman et al. | 366/141 |
| 2008/0066911 | A1 | 3/2008 | Luharuka et al. | 166/283 |
| 2009/0107734 | A1 | 4/2009 | Lucas | |

FOREIGN PATENT DOCUMENTS

| | | |
|---|---|---|
| DE | 295 18 215 U1 | 5/1996 |
| WO | WO 94/19263 | 9/1994 |

OTHER PUBLICATIONS

Boerger pump—available at: http://www.boerger-pumps.com/contero/gallery/Prospekte_USA/us_p_ssr_boerger_powerfeed_0309.pdf.

* cited by examiner

SAFE AND ACCURATE METHOD OF CHEMICAL INVENTORY MANAGEMENT ON LOCATION

BACKGROUND

For many oilfield service operations, numerous chemicals must be used to achieve useful production from oil and gas wells, including surfactants, buffers, acids, bases, crosslinkers, breakers, etc. For most operations, chemicals are brought to the location in a concentrated form and diluted on site to achieve the desired final concentrations.

Typically, such liquid chemical concentrates are transported to the location of the well via trucks, trailers or skids, including stakebeds, float trailers, or liquid metering systems. Due to inaccurate measurement methods and other errors, it is often necessary to determine the amount of chemical in a given tank when the tank arrives. In part because the well is usually situated in a remote location, no sophisticated technique for measuring the quantity of chemical in the tank at the site of the well has been available. The measurement has traditionally required field personnel to climb above the tank and use a long measuring stick to determine the quantity of chemical in the tank.

Later, after some of the chemical in the tank has been discharged, it is often necessary or desirable to measure the amount of chemical remaining in the tank. As the instruments currently used for measuring the rate of discharge of the chemical from the tank are not sufficiently accurate, the tank is usually measured again by field personnel from above the tank.

The field personnel required to make these manual measurements are subjected to significant risks while performing the measurements. Many of the chemicals found in the tanks pose health risks, and because the field personnel are forced to work near openings in the tanks, they can be exposed to harmful chemicals. The field personnel also face the risk of falling, since manual measurements necessitate their climbing on top of the truck, trailer and/or tank.

In addition to the health and safety hazards attendant to the manual measuring method, using a measuring stick to determine the amount of chemical in the tank results in inherently inaccurate measurements. The measuring stick could be inserted at a slight angle and/or slight movements could cause the chemical to splash and produce an incorrect reading. Even under ideal conditions, a measuring stick can only be expected to determine the quantity of chemical remaining within a significant margin of error.

Traditional manual measurements require substantial time as well. Field personnel must then expend their valuable time by climbing on top of the tank, carefully measuring the depth of the chemical and climbing back down. The safety measures necessitated by the process consume additional time and human resources.

Due in part to these shortcomings of traditional chemical management, a weight-based system and method for measuring and managing dry chemical additives was developed and disclosed in U.S. Pat. Nos. 4,353,482, 4,410,106, 4,265,266, and 4,427,133. While these inventions present significant improvements over manual methods of measuring dry chemical additives, the accuracy of their measurements suffers due to failure to correct for off-axis forces, inclines, imprecise measurements of tank weight and other problems. In addition, a mobile weight-based management system for liquids, slurries, solutions or suspensions is desirable.

FIGURES

Some specific example embodiments of the disclosure may be understood by referring, in part, to the following description and the accompanying drawings.

Figure 1:
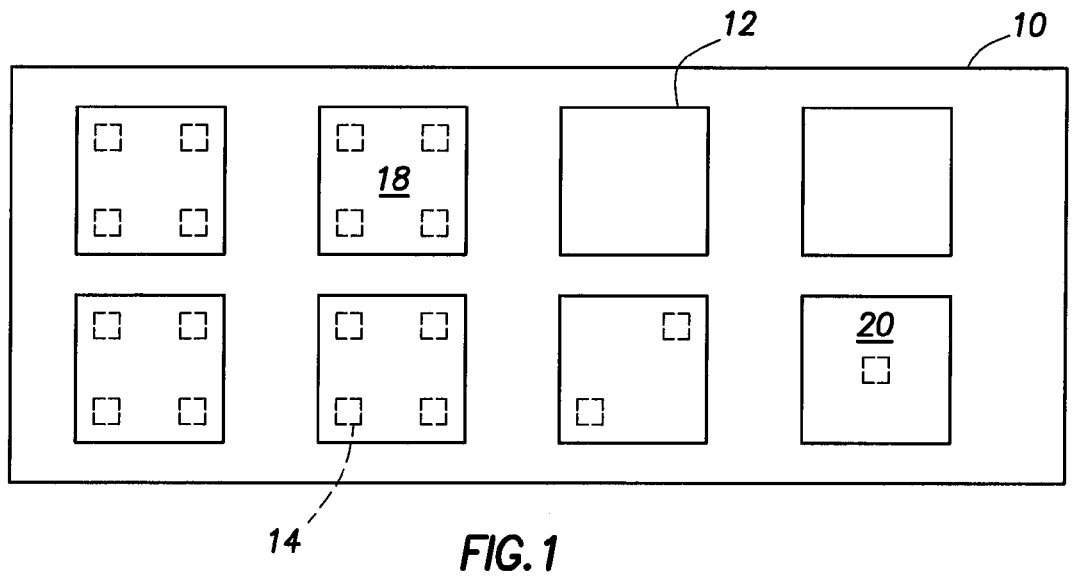
FIG. 1 is a bird's-eye view of a trailer with several chemical storage units and various configurations of load cells beneath them, in accordance with an exemplary embodiment of the present invention.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

SUMMARY

The present disclosure relates to methods and systems for accurately measuring the weight of chemicals contained in a mobile storage unit, and more particularly for measuring differences in the weight of industrially useful substances at remote locations.

In one embodiment, the present invention provides a method of measuring an amount of a substance depleted from a storage unit, comprising the steps of: supporting the storage unit on a vehicle, measuring a first weight of the storage unit and any liquid substance contained in the storage unit, allowing a quantity of the liquid substance to be discharged from the storage unit, measuring a second weight of the storage unit and any liquid substance contained in the storage unit, and determining the amount of liquid substance discharged or allowed to be discharged from the storage unit based on the first weight measurement and the second weight measurement.

In one embodiment, the present invention provides a mobile chemical management system, comprising: a storage unit, a vehicle operable to transport the storage unit and any contents thereof, an industrially useful substance contained within the storage unit, a discharge control mechanism operable to control the discharge rate of the industrially useful substance from the storage unit, and at least two measuring devices, coupled to the storage unit and operable to produce signals corresponding to the force of gravity upon the storage unit and the contents thereof.

In one embodiment, the present invention provides a method for determining the weight of a substance contained in a storage unit, comprising: transporting an industrially useful substance with a vehicle, using one or more measurement devices to produce one or more weight measurements of the industrially useful substance in the storage unit without removing the storage unit from the vehicle, measuring a degree of deviation along an axis from a level position of the storage unit or the measurement device, processing the one or more weight measurements and the degree of deviation to produce a second, more accurate weight measurement.

The features and advantages of the present disclosure will be readily apparent to those skilled in the art upon a reading of the description of exemplary embodiments, which follows.

DESCRIPTION

The present disclosure relates to systems and methods for measuring the weight of industrially useful substances contained in a storage unit, and more particularly for measuring differences in the weight of chemical additives stored in portable containers.

In one embodiment of the present invention, the storage units are tanks such as chemical tote tanks or Hal tanks, which contain liquid substances, such as liquid chemicals, slurries, solutions or suspensions. The liquid substance may be transported via a vehicle, such as a truck, trailer or skid, to a remote site for, among other things, application to a well bore in conjunction with a well service operation for oil or gas. In this embodiment, stakebeds, liquid management system trailers and float trailers are preferred vehicles for transportation of the liquid substance.

The substance contained in the storage units is either discharged or allowed to be discharged from the storage units at a rate controlled by a discharge control mechanism. The metered discharge of the present invention can be actively performed, as with a pump, or can be passively regulated, by relying on gravity or some other force to push or pull the substance from the storage unit. In either case, however, the discharge or release of the substance from the storage unit is controlled by some type of discharge control mechanism.

When the storage unit contains a liquid substance, the discharge of the liquid substance may be facilitated by a pump and monitored by a flowmeter or by the speed of the pump. In accordance with the present invention, the rate of discharge of the substance may be more accurately determined by reliance on periodic measurements of the load of the storage unit. Alternatively, the load-measuring devices may be utilized only when particular accuracy is required, leaving the general task of monitoring the discharge rate to the flowmeter or other analogous discharge rate-sensing means.

In an exemplary embodiment, load cells are used to determine the force exerted by gravity on a storage unit and it contents. Electronic load cells are preferred for their accuracy and are well known in the art, but other types of force-measuring devices may be used. As will be apparent to one skilled in the art, however, any type of load-sensing device can be used in place of or in conjunction with a load cell. Examples of suitable load-measuring devices include weight-, mass-, pressure- or force-measuring devices such as hydraulic load cells, scales, load pins, dual sheer beam load cells and pressure transducers.

Referring to the embodiment depicted in FIG. 1, multiple storage units 12 are positioned in a vehicle 10. Load cells 14 are located between the storage units 12 and the floor of the vehicle 10. The load cells 14 produce signals corresponding to the force of gravity on the storage units 12 and their contents, and those signals are either read directly or processed to determine the weight of the storage unit and any remaining substance therein. In one embodiment, four load cells are positioned symmetrically between a storage unit 18 and the floor of the vehicle. In another embodiment, only one load cell is associated with one storage unit 20.

The load-measuring devices may be attached to the bottom of the storage units, present on the floor of the vehicle, configured between the units and a point of suspension or may be otherwise configured so as to produce a signal or measurement based upon the weight of the storage unit or some portion thereof. The use of multiple load-measuring devices (such as load cells) for each storage tank or load increases the accuracy of the total weight measurement.

Although the improvements described herein improve the accuracy of the measurements taken in conjunction with chemical management, still more accurate means of measuring weight are available at permanent facilities with precision scales. In order to reduce the error in measurements taken by the load cells or other measuring devices associated with the portable storage tanks, the weight of the portable storage tanks should preferably be measured independently using a precision scale at a permanent facility. Usually, the tanks should be weighed both when empty and when containing a substance. After the weight of the tank is determined, the weight of any substance in the storage unit may be calculated by the load cells or other measuring device at any time by measuring the total weight of the unit and its contents and subtracting the independently measured empty weight of the storage unit. The weight measurements produced by the precision scales are particularly useful for calibration of the load-measuring devices and the processing means disclosed herein.

With additional processing and with the recording of the time elapsed between weight measurements, multiple weight measurements from the load-measuring device(s) may also be used to determine the rate of discharge of the substance from the storage unit. If desired, this measured rate of discharge may be used to manually or automatically adjust the means for discharging the chemical to achieve the desired rate of discharge.

While this disclosure refers to a liquid chemical, it could easily be adapted for any industrially useful substance, including liquids, dry materials, slurries, solutions or suspensions. In another embodiment, for example, the storage units may contain dry gel polymer. The dry gel polymer may also be used as an additive during a well service operation, but the present invention is not limited to chemical inventory management in well service operations. The present invention may be applied in any circumstance when the weight, mass, volume or rate of discharge of an industrially useful substance is desired, especially when the measurement must be taken at a remote location. The present invention may also be adapted to accommodate mixtures such as cement or granular substances such as sand.

Any number of load cells or other measuring device can be used to measure the weight of the storage unit, though four are used in a preferred embodiment. The measuring devices may also be arranged in various patterns depending on the shapes of the storage unit(s) and vehicle and other factors. It is desirable that multiple measuring devices be used to measure each storage unit, as the accuracy of the measurement increases when multiple measuring devices are used.

In one embodiment, the storage units and load cells are attached to the vehicle. Alternatively, the storage units may not be fixed to the vehicle, in which case the load cells may be attached to the trailer, may be attached to the storage units, may be integrated into a cradle which holds the tank mounted on the vehicle, or may be mobile and able to be moved into various configurations depending on the needs of a particular shipment. In yet another embodiment, load cells are attached to one or more mobile pallets or scales. The storage units may then be placed on the pallets when loaded in the vehicle.

Because the weight of the storage units will typically be measured while the units are resting on a vehicle 10 at a remote location (such as an oil well), at least two conditions at the remote location could lead to inaccurate weight measurement. First, the vehicle 10 and any storage tanks 12 therein may not be perfectly level, resulting in unevenly distributed and/or non-normal gravitational forces being applied to each weighing device. Second, wind or some other non-gravitational external force may influence the force sensed by any of the weighing devices.

Figure 2:
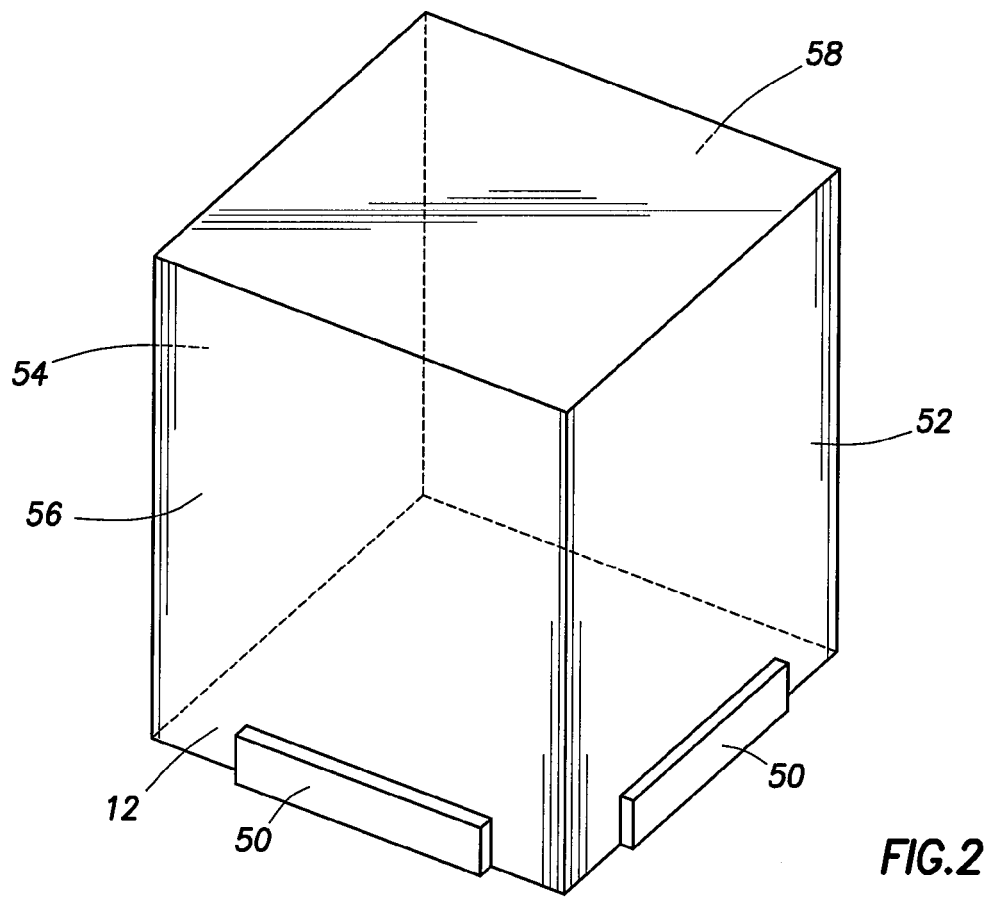
FIG. 2 shows two inclinometers configured to measure the tilt of a storage unit, in accordance with an exemplary embodiment of the present invention.
Figure 3:
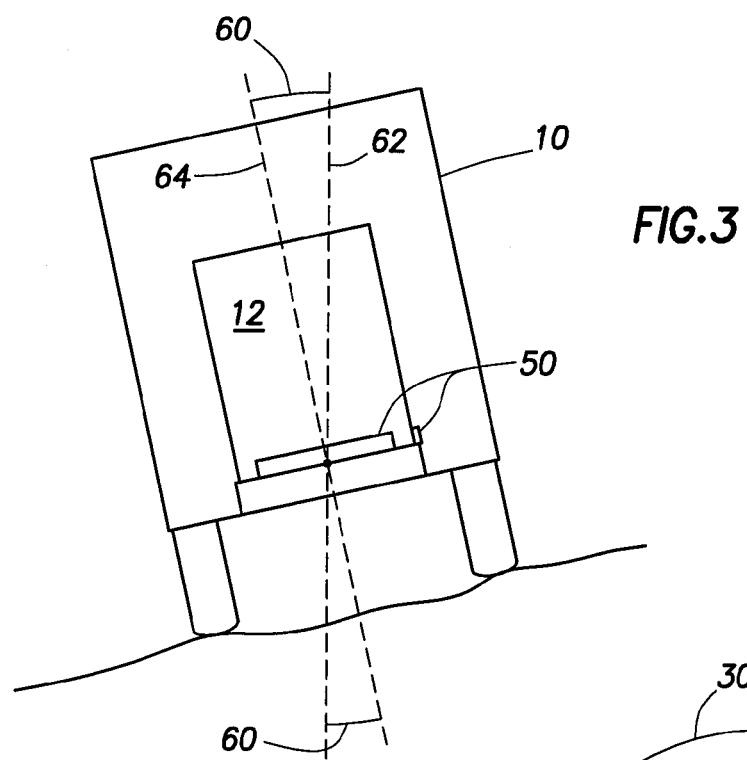
FIG. 3 is a rendering of a vehicle containing storage units in a non-level position, in accordance with an exemplary embodiment of the present invention.

Referring to the embodiment depicted in FIGS. 2 and 3, inclinometers 50 or other level measuring devices may be used to measure the degree 60 to which the storage units 12 are not level with respect to gravity and/or the weighing devices. The degree of deviation 60 from the level position is taken as the angle between the axis of gravity 62 and the axis 64 normal to the load-measuring device. Many standard inclinometers 50 produce electrical signal outputs representative of the measured degree of deviation 60 from a level position, also known as tilt. These signals can then be used to adjust the weight measurements provided by the measuring devices. Because the degree of deviation 60 from the level position can affect the measurements produced by the measuring devices, knowledge of the degree of deviation 60 from the level position permits mathematical correction of the measurements. Inclinometers 50 can be used in this manner to detect and correct for tilt on one or more axes.

Referring to the embodiment depicted in FIG. 2, two or more level measuring devices 50 may be used to correct for the degree of deviation from the level position along multiple axes. One of the level measurement devices may be positioned against side 52 of storage unit 12 and be operable to measure the degree of deviation from the level position in the plane of storage unit side 52. Another level measurement device may be positioned along side 56 of storage unit 12 and be operable to measure the degree of deviation from the level position in the plane of side 56. The first level measurement device may thus measure tilt from side 52 to side 54, whereas the second level measurement device may measure tilt from side 56 to side 58.

Once the degree of deviation 60 from the level position is known, the measured weight may be corrected by dividing the measured weight by the cosine of the degree of deviation 60. Other mathematical calculations well known in the art may also be used to adjust the measured weight based on the degree of deviation 60 from the level position.

When multiple weighing devices are used, they may be arranged specifically to counter any undesired forces or moments that may cause the weighing devices to report an inaccurate weight. In particular, the weighing devices should be arranged in a symmetrical configuration such that for each load cell affected by the undesired force, another load cell produces an opposite response. When the forces measured by the weighing devices are summed to determine the total weight, the impact of the undesired force will be reduced or cancelled out by the equal and opposite measurements of the force by separate weighing devices.

Figure 4:
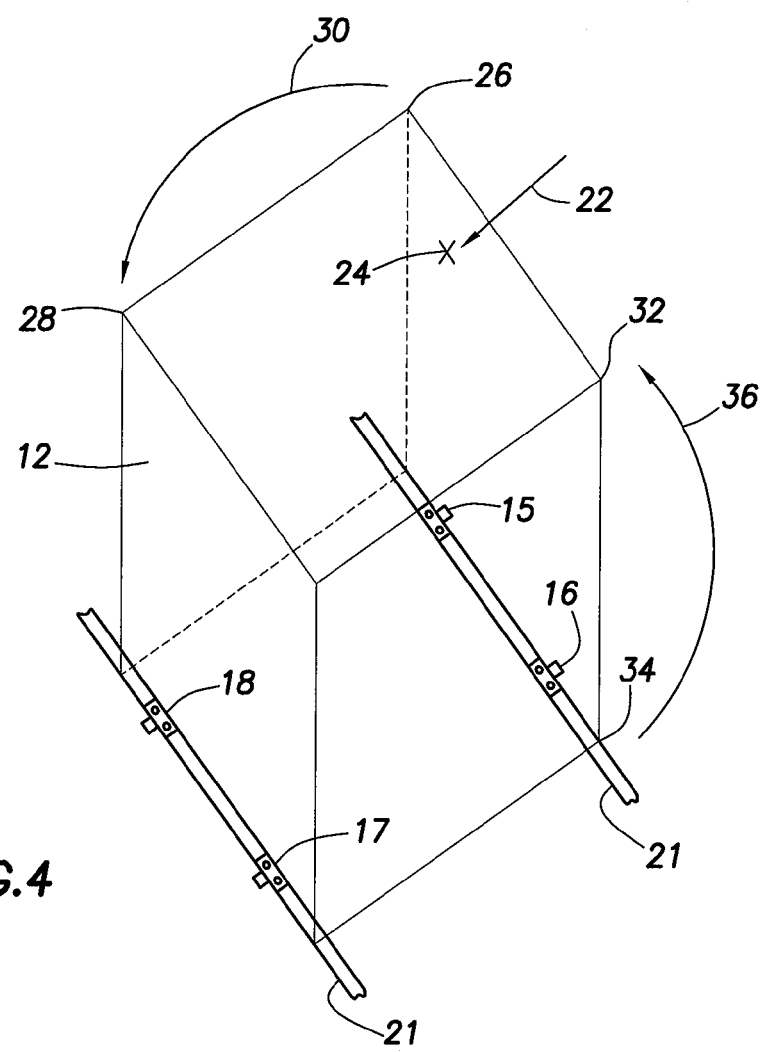
FIG. 4 is a three-dimensional rendering of an example chemical storage unit with four load cells, in accordance with an exemplary embodiment of the present invention.

Referring to the embodiment shown in FIG. 4, load cells 15, 16, 17 and 18 are positioned between a storage tank 12 and the frame 21 of a vehicle. Load cells 15, 16, 17 and 18 support the same load, but load cell 15 is 180 degrees out of phase with respect to load cell 18, and load cell 16 is 180 degrees out of phase with respect to load cell 17. When an undesired force or moment, such as an off-axis force due to wind 22, is applied to the portable storage tank, the force affects the load cells 15, 16, 17 and 18 in an equal and opposite manner. When the readings of the load cells are summed to determine the total weight of the storage unit 12, the components of the measurements due to the undesired forces tend to cancel, leaving a more precise measurement of the weight of the portable storage tank and its contents.

If an undesired force 22 is centered at point 24, moments 30 and 36 will be created. Corner 26 of storage unit 12 will tend to rotate toward corner 28, while corner 34 will tend to rotate toward corner 32. Unless load cells 15, 16, 17 and 18 are arranged symmetrically and are out of phase with respect to each other, the forces measured by load cells 15, 16, 17 and 18 will be less accurate due to interference from the undesired force 22.

The reduction or cancellation of the contribution from undesired off-axis forces and/or moments occurs due to the similar nature of the load cells. In one embodiment, strain gauges are arranged and mounted internally to produce an output which is primarily sensitive to the desired weight measurement. The strain gauges or other load-measuring devices will still have some sensitivity to off-axis forces, but because the load-measuring devices are nearly identical in construction, causing a common force or moment to be applied to the load-measuring devices in an opposite manner causes them to tend to produce contributions of opposite polarity. When the readings from the load-measuring devices are ultimately combined to produce the total load measurement, the unwanted contributions will tend to cancel and the total load measurement will be more accurate.

While the load and degree of deviation measurements contemplated by the present invention may be taken manually, an automatic means of processing the information generated by the measurement devices is desirable. In one embodiment, a computer system is electrically coupled to the load-measuring devices and/or the level measuring devices and receives electronic signals from those devices. The computer system can be configured to automatically perform calculations to compensate for off-axis forces or moments and the degree of deviation from the level position.

The computer system may also be configured to record multiple weight measurements over a given period of time. The computer system may then be used to calculate the rate of discharge by, for example, dividing the difference of any two weight measurements by the time elapsed between the measurements. In some embodiments, the computer system will further be operable to compare the calculated discharge rate with the desired discharge rate and to automatically increase or decrease the actual discharge rate by communicating with or otherwise manipulating the discharge control mechanism. By performing this adjustment substantially in real-time, the accuracy of the actual discharge rate is enhanced.

A computer system adds further functionality in contexts, such as well service operations, where the substance contained in the storage unit is to be mixed with another substance in a specified ratio. The computer system may monitor the weights and discharge rates of multiple storage units and be operable to adjust the discharge rates (via multiple discharge control mechanisms) to conform to a series of predefined or user-specified ratios. The increased accuracy of the weight-based system disclosed herein facilitates closer adherence to the desired ratios, especially when the discharge rates are adjusted substantially in real-time.

What is claimed is:

1. A method for measuring an amount of a substance depleted from a storage unit, the method comprising:
   supporting the storage unit on a vehicle;
   measuring a first weight of the storage unit and any liquid substance contained in the storage unit using at least two load-measuring devices;

allowing a quantity of the liquid substance to be discharged from the storage unit;

measuring a second weight of the storage unit and any liquid substance contained in the storage unit using at least two load-measuring devices; and determining the amount of liquid substance discharged or allowed to be discharged from the storage unit based on the first weight measurement and the second weight measurement;

wherein the at least two load-measuring devices are configured such that at least one of a force or a moment measured by one of the at least two load-measuring devices, other than gravitational force of the storage unit and its contents, is reduced or cancelled by summation with forces or moments measured by the remaining of the at least two load-measuring devices.

2. The method of claim 1, further comprising:

repeatedly measuring the weight of the storage unit and liquid substance contained in the storage unit; and determining, substantially in real-time, the amount of liquid substance discharged or allowed to be discharged based on any two or more of the weight measurements.

3. The method of claim 1, wherein an empty weight of the storage unit is measured with a high-precision scale before the storage unit is loaded into the vehicle.

4. The method of claim 1, wherein the weight of the storage unit and liquid substance is calculated based on information provided by the at least two load-measuring devices.

5. The method of claim 4, wherein four of said load-measuring devices are arranged in a rectangular pattern and used to determine the amount of liquid substance remaining in the tank.

6. The method of claim 1, further comprising delivering the discharged liquid substance to a blender for use in a well service operation.

7. The method of claim 4, wherein the storage units are located on mobile pallets, and wherein the at least two load-measuring devices are attached to the mobile pallets.

8. A mobile chemical management system, comprising:

one or more storage units;

a vehicle operable to transport the storage unit and any contents thereof;

one or more industrially useful substances contained within the one or more storage units;

one or more discharge control mechanisms operable to control discharge rates of the one or more industrially useful substances from the one or more storage units; and at least two measuring devices coupled to each storage unit and operable to produce a signal corresponding to the force of gravity upon the storage unit and the contents thereof;

wherein the at least two measuring devices are configured such that at least one of a force or a moment measured by one of the at least two measuring devices, other than gravitational force of the storage unit and its contents, is reduced or cancelled by summation with forces or moments measured by the remaining of the at least two measuring devices.

9. The system of claim 8, wherein the at least two measuring devices are selected from the group consisting of a weight-sensing device, a mass-sensing device, a pressure-sensing device, a load-sensing device and a combination thereof.

10. The system of claim 8, wherein the at least two measuring devices are arranged symmetrically.

11. The system of claim 8, wherein the industrially useful substance comprises a chemical to be used in conjunction with a well service operation.

12. The system of claim 8, further comprising a processing system operable to receive and process electrical signals from the at least two measuring devices.

13. The system of claim 12, wherein the processing system is further operable to communicate with the discharge control mechanism to change the discharge rate of the industrially useful substance.

14. The system of claim 12, wherein two or more industrially useful substances are allowed to be discharged for combination in one or more desired ratios; and wherein the processing system is operable to monitor the signals produced by the measuring devices substantially in real-time and to adjust two or more discharge control mechanisms to achieve the desired ratios of the two or more industrially useful substances.

15. A method for determining the weight of a substance contained in a storage unit, the method comprising:

transporting an industrially useful substance with a vehicle;

using two or more measurement devices to produce two or more weight measurements of the industrially useful substance in the storage unit without removing the storage unit from the vehicle;

measuring a degree of deviation along an axis from a level position of the storage unit or the two or more measurement devices;

processing the two or more weight measurements and the degree of deviation to produce a second, more accurate weight measurement;

wherein the two or more measuring devices are configured such that at least one of a force or a moment measured by one of the two or more measuring devices, other than gravitational force of the storage unit and its contents, is reduced or cancelled by summation with forces or moments measured by the remaining of the two or more measuring devices;

measuring a second weight of the industrially useful substance in the storage unit; and calculating, based on the time elapsed between the first and second measurements, a calculated discharge rate of the industrially useful substance from the storage unit.

16. The method of claim 15, further comprising the step of automatically adjusting a discharge rate of the industrially useful substance based on the calculated discharge rate.

17. The method of claim 15, wherein an inclinometer is used to perform the measuring of the degree of deviation from a level position.

18. The method of claim 15, further comprising measuring a degree of deviation from a level position along a second axis.

* * * * *